Dec. 15, 1942.   A. E. HOUSE   2,305,163
WELDING METHOD AND APPARATUS THEREFOR
Filed Oct. 21, 1941   2 Sheets-Sheet 1

INVENTOR
ALBERT ERNEST HOUSE
Ernest E Carver
ATTORNEY.

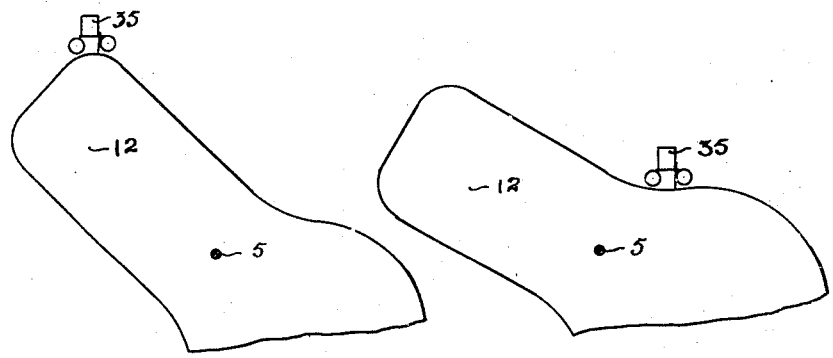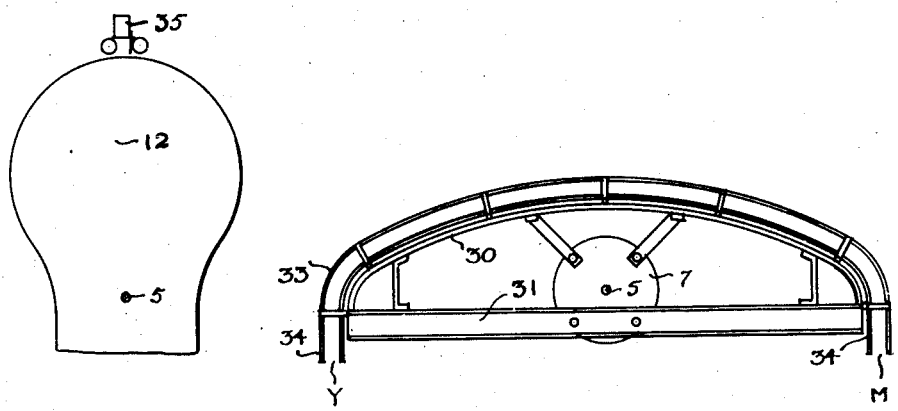

Patented Dec. 15, 1942

2,305,163

UNITED STATES PATENT OFFICE 2,305,163

WELDING METHOD AND APPARATUS THEREFOR

Albert Ernest House, Vancouver, British Columbia, Canada

Application October 21, 1941, Serial No. 415,926

7 Claims. (Cl. 219—8)

My invention relates to improvements in welding methods and apparatus therefor.

Welding machines, while capable of expediting the welding of one piece of metal to another have been subjected to somewhat limited use in the past primarily because in their operation the molten welding metal for some distance from the point of heat application requires the work at the point of weld to be maintained in a substantially horizontal position until the weld metal has cooled down below the fluid state.

The present invention is designed to enhance the utility of such machines by providing means whereby any irregular shaped piece of work may be rocked in such a manner that any point of said work to be welded may be brought to substantially horizontal position immediately adjacent the welding rod or flame, thus preventing the endwise flow of metal beyond the normal fluid metal pool limit.

Fig. 3 is an enlarged transverse sectional view of the track on which a welding machine is operated.

Fig. 4 is a detail view showing the preferred rack employed to gear the welding machine to.

Figs. 5, 6 and 7 show diagrammatically various positions of the welding device when welding around the combustion box of a Scotch marine boiler.

Fig. 8 is a view showing the mounting of a pair of semi-elliptical members to be welded along adjacent peripheral edges.

In the drawings like characters of reference indicate corresponding parts in each figure.

Figures 1, 2:
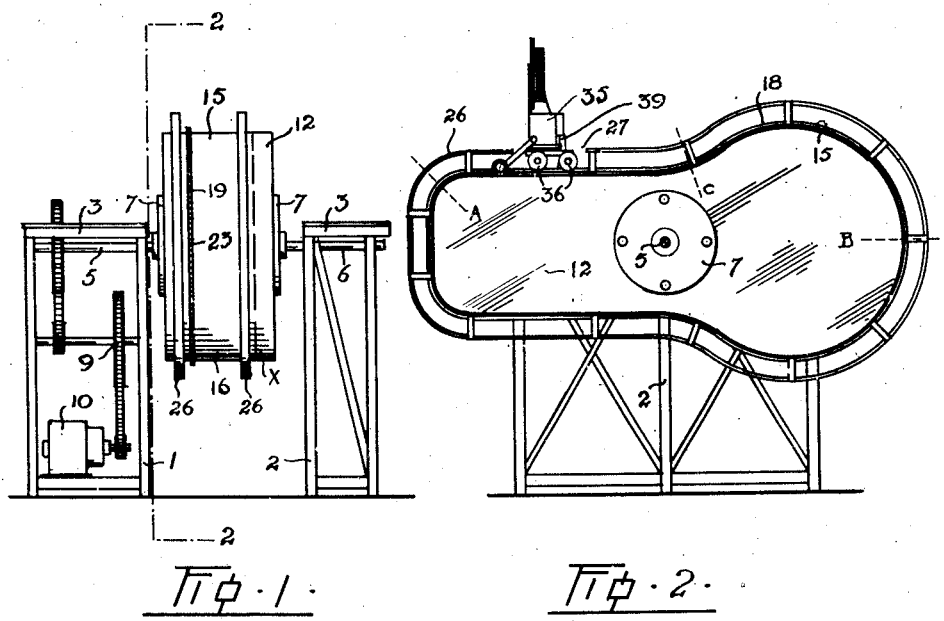
Fig. 1 is a front elevational view of the invention.
Fig. 2 is a transverse sectional view taken on the line 2—2 of Figure 1.

The numerals 1 and 2 indicate a pair of frames having top platforms 3. Below each of the platforms aligned shafts 5 and 6 are mounted, both of which are fitted at their inner ends with face plates 7 to which the work to be welded peripherally is mounted, the work shown in the Figures 1, 2, 5, 6 and 7 being a combustion box of a Scotch marine boiler.

The shaft 5 is adapted to be rotated in either direction at very low speed through a suitable reduction train 9 by a motor 10. The motor 10 is preferably controlled by a push button switch, not shown, which would be placed in a position convenient to the welder.

To facilitate the mounting of the work, indicated by the numeral 12, the shaft 6 is slidably mounted, so that its face plate 7 can be separated from the face plate of the shaft 5 to permit the work to be entered between them. Surrounding the work is a jig, generally indicated by the numeral 15, which consists of a sleeve 16 or framework, see detail view of Figure 3, conforming to the contour of the work and being evenly spaced therefrom by studs 17 which also serve to hold the sleeve in adjusted position. Surrounding the sleeve is a pair of track rails 18 upon which the wheels of any desired welding machine or equipment may move. A rack 19 is fitted around the sleeve which is engaged by the welding machine to ensure the constant movement of said machine along the track rails.

Figures 3, 4:
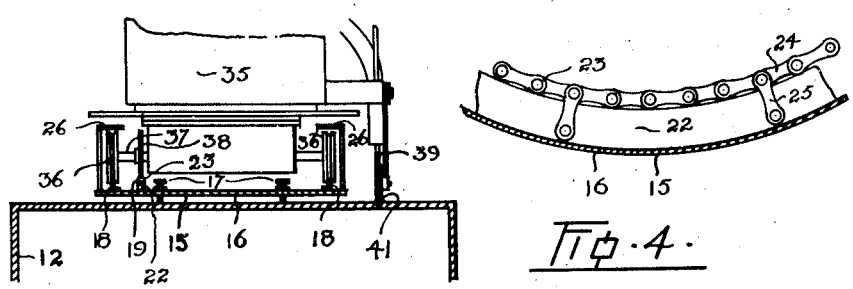

The rack here shown and which I have found particularly adaptable to any irregular surfaces such as in boiler work consists of a rail 22, see detail in Figure 4, of the same width as a roller chain 23 lying thereon. The chain is made up with the usual side links 24 and additional links 25 at intervals of its length, which are set at an angle to the run of the chain and serve as means to connect said chain to the rail 22. By this means the chain can be held in position in concave curves as shown in Figure 4, as in all other positions, so that it will not creep or in any way affect the constancy of travel of the welding machine.

Mounted in spaced relation above the rails 18 are guard rails 26 which are supported in close proximity to the top of the welding machine wheels so as to safeguard the machine in case of accident. A gap 27 is provided in the guard rails 26 to permit the welding machine to be positioned upon the jig.

In Figure 8 the work indicated by the numeral 30, is semi-elliptical and having no end plate is required to be mounted on a suitable framework 31 which in turn is mounted on the face plates 7 to permit of the work being rocked. A jig 33 is suitably secured to the work and is provided with straight track and guard rail extensions 34 to enable the welding machine to be carried beyond the work and the weld to be made to the extreme edge of said work.

The welding machine shown, which is indicated generally by the numeral 35, is provided with pairs of drive wheels 36 which run on the track rails 18. One pair of said wheels are secured to a driven shaft 37 upon which a sprocket 38 is also secured. The engagement of the sprocket with the chain 23 provides a positive drive of the machine around the sleeve.

The welding machine 35 is provided with an electrode or welding rod 39 which is suitably advanced downwards into the groove 41, see Figure 3, where the welded seam is to be made.

In starting to weld the seam X shown in broken line in Figure 1, the work is set in the position shown and the machine set to move to the left of the Figures 2, 5 and 6 and 7 or in an anticlockwise direction. When it approaches the curved corner A the motor 10 is started to rock the work in a clockwise direction, the speed of rotation of the work and the speed of movement of the machine being so coordinated that the length of seam groove wherein the weld metal is in a molten state will be substantially horizontal. Since the metal is progressively setting the machine and the pool are progressively moving against the direction of rotation of the work. While the weld is being made at the curved corner A the machine will be rising as indicated in Figure 5 while remaining vertical all the time. When horizontally straight portions of the seam are being made the motor 10 will be stopped. When the work has been turned to the position shown in Figure 6 the machine will have traveled throughout its entire distance with its wheels on a horizontal plane, but it will have been raised by the rotation of the work to its highest point. Figure 7 shows the machine still on a horizontal base at the point C of Figure 2.

It will be obvious that when the control of the movement of the tool and the control of the motor 10 are properly synchronized the surface of the finished seam relative to the surface of the work will be constant throughout its entire length irrespective of the straight, convex or concave nature of the seam.

In welding a seam on work such as that shown in Figure 8 the same procedure follows as that above described. The machine would enter the jig at the point M with the frame 31 turned up to a vertical position and the seam would be finished when the frame had been turned 180 degrees and the machine would be within the portion Y of said frame.

What I claim as my invention is:

1. An apparatus for supporting a welding tool above a body in which a seam of vertically irregular contour is to be welded, said apparatus comprising a track parallel to the seam along which the tool is adapted to be moved and means for rotating the body and the track and means associated with the welding tool for impelling said machine along the track.

2. An apparatus for supporting a welding tool above a body in which a seam of vertically irregular contour is adapted to be welded, said apparatus comprising a sleeve portion conforming peripherally to the contour of the body and its seam, means for securing the sleeve portion to the body, said sleeve being provided with a pair of rails upon which the welding tool is adapted to travel.

3. An apparatus for supporting a welding tool above a body in which a seam of vertically irregular contour is adapted to be welded, said apparatus comprising a sleeve portion conforming peripherally to the contour of the body and its seam, means for securing the sleeve portion to the body, and means for rotating the body about a horizontal axis.

4. An apparatus for welding irregularly shaped bodies circumferentially comprising a track conforming to the periphery of said body and carried thereby, a welding machine upon the track, said welding machine being provided with self-propelling means for moving it lengthwise of the track.

5. An apparatus for welding irregularly shaped bodies circumferentially comprising a track adapted to be mounted upon the work and being parallel thereto, a welding machine upon the track and self-propelling means integral with the welding machine for moving said welding machine lengthwise of the track.

6. The method of welding a peripheral seam on a body of irregular contour which comprises entirely supporting a welding tool upon the body and moving it along the seam at a substantially constant speed and rotating the work about an axis at irregular speed to maintain the welding tool in a substantially vertical position.

7. An apparatus for supporting a self-propelling welding tool vertically above a body in which a seam of vertically irregular contour is to be welded, said apparatus comprising a track parallel to the seam along which the tool is adapted to move at a substantially constant speed in one direction, and means for rotating the body and the track in a direction opposite to the direction of the welding tool relative to the track.

ALBERT ERNEST HOUSE.